(12) United States Patent
Keate et al.

(10) Patent No.: US 6,549,591 B1
(45) Date of Patent: Apr. 15, 2003

(54) METHOD AND APPARATUS FOR DIGITAL INTERFERENCE REJECTION

(75) Inventors: Christopher Keate, Santa Clara, CA (US); Ravi Bhaskaran, Santa Clara, CA (US); Dariush Dabiri, Fremont, CA (US)

(73) Assignee: LSI Logic Corporation, Milpitas, CA (US)

( * ) Notice: Subject to any disclaimer, the term of this patent is extended or adjusted under 35 U.S.C. 154(b) by 53 days.

(21) Appl. No.: 09/712,403

(22) Filed: Nov. 13, 2000

Related U.S. Application Data

(63) Continuation of application No. 09/008,109, filed on Jan. 16, 1998, now Pat. No. 6,167,098.

(51) Int. Cl.[7] .................. H04L 25/08; H04L 27/08; H04L 7/00; H04B 1/10

(52) U.S. Cl. .................. 375/346; 375/345; 375/350; 375/355

(58) Field of Search .................. 375/345, 344, 375/350, 346, 355, 285, 316, 340

(56) References Cited

U.S. PATENT DOCUMENTS

| | | | | |
|---|---|---|---|---|
| 5,504,785 A | * | 4/1996 | Becker et al. | 375/344 |
| 6,167,098 A | * | 12/2000 | Keate et al. | 375/346 |

* cited by examiner

*Primary Examiner*—Tesfaldet Bocure
(74) *Attorney, Agent, or Firm*—Thelen, Reid & Priest LLP

(57) ABSTRACT

Digital interference rejection of a signal is accomplished by first converting the signal to digital. Then a second signal is generated and mixed with the first signal. This combined signal is then filtered. The signal can then be scaled as needed, resulting in a finely tuned, interference free signal.

50 Claims, 5 Drawing Sheets

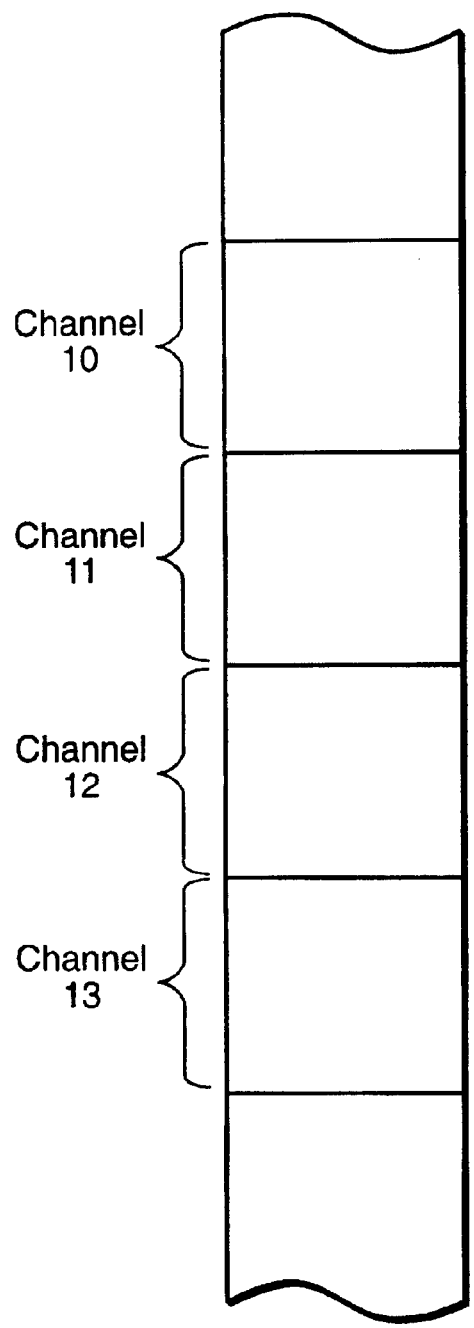
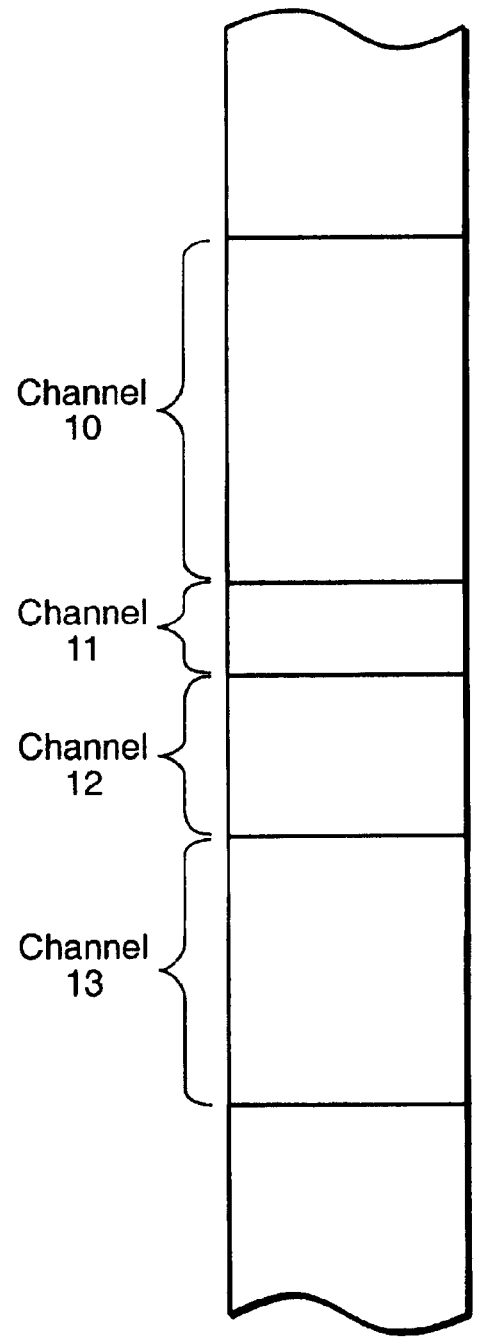
FIG._1          FIG._2

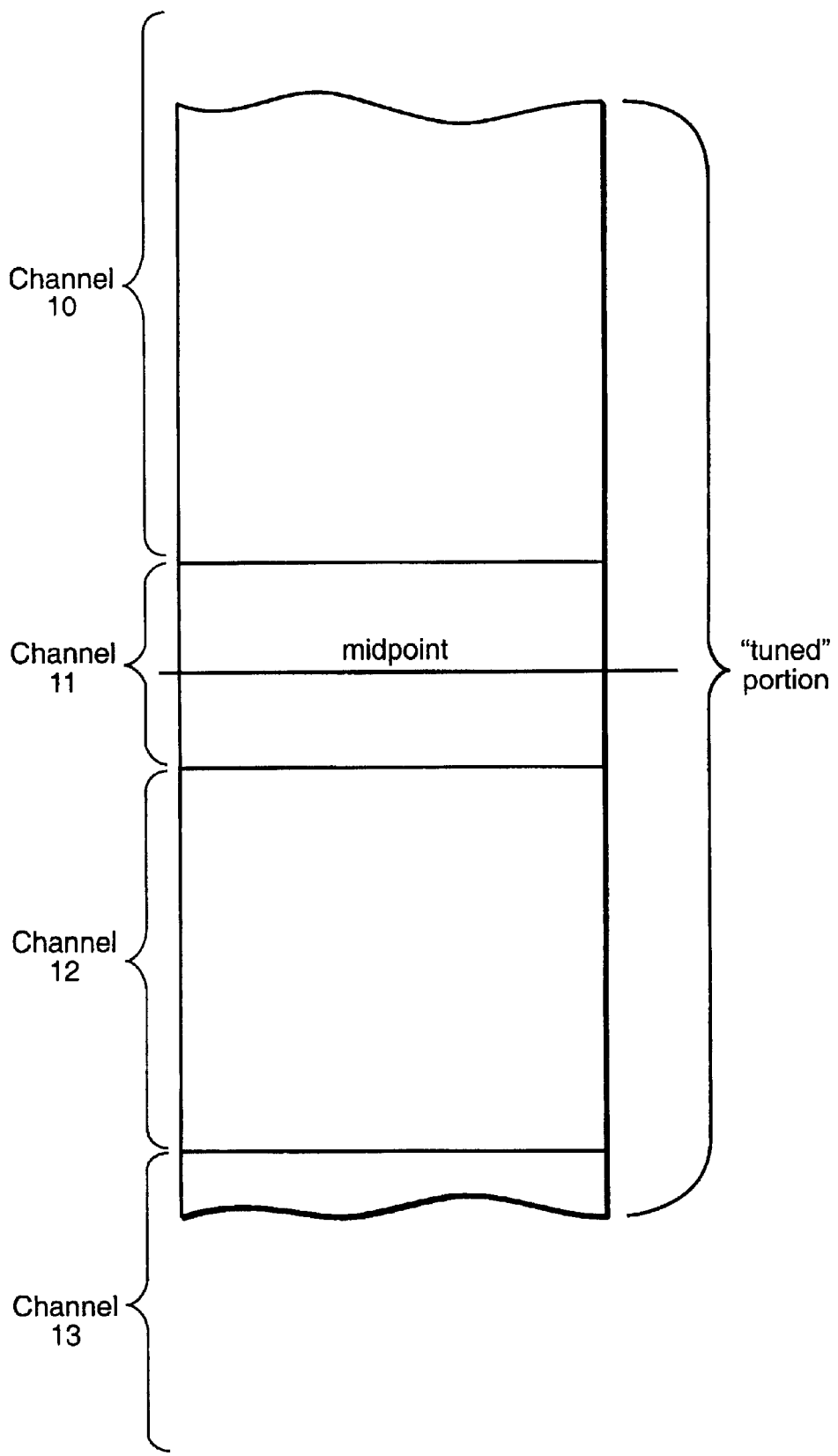
FIG._3

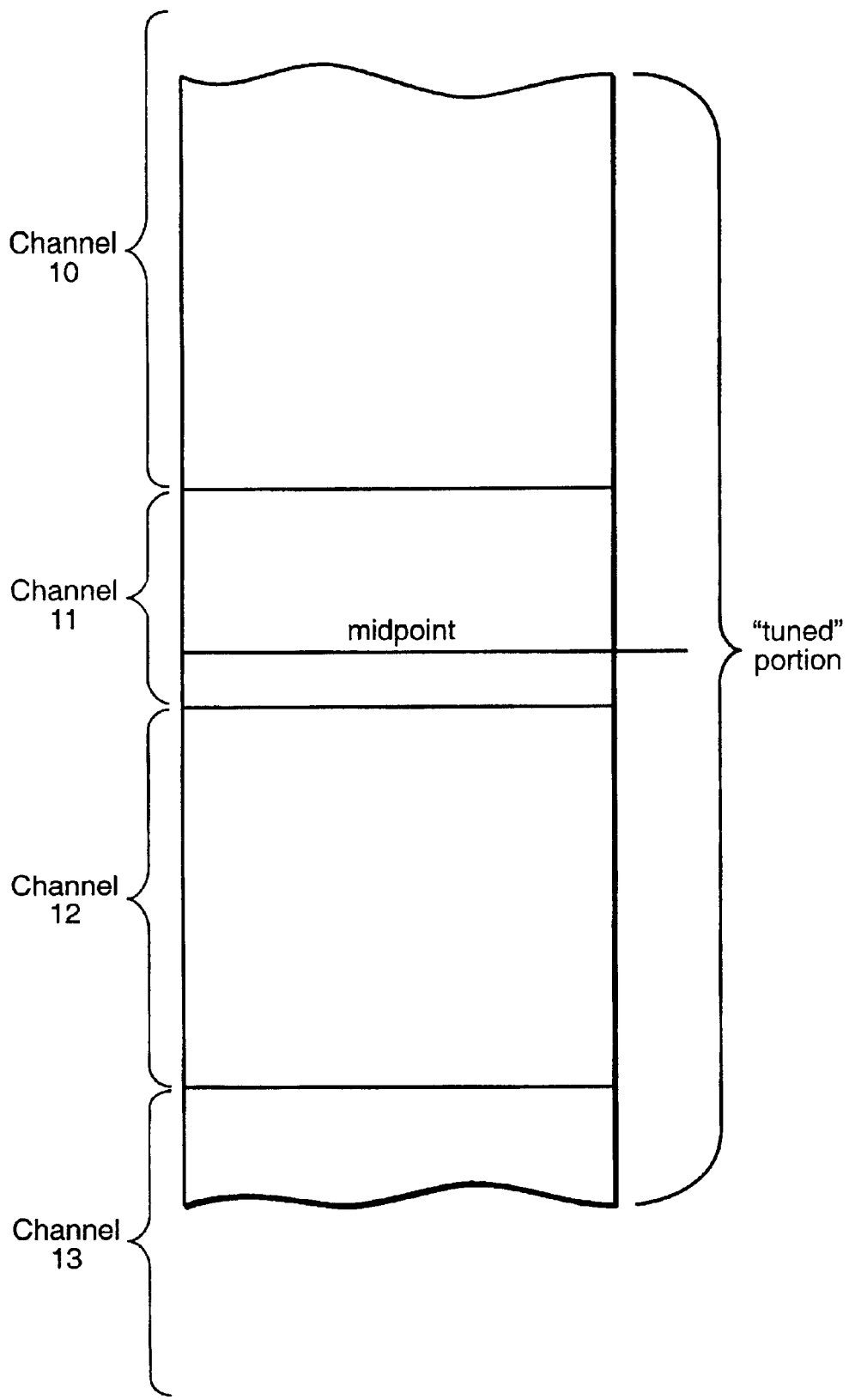
FIG._4

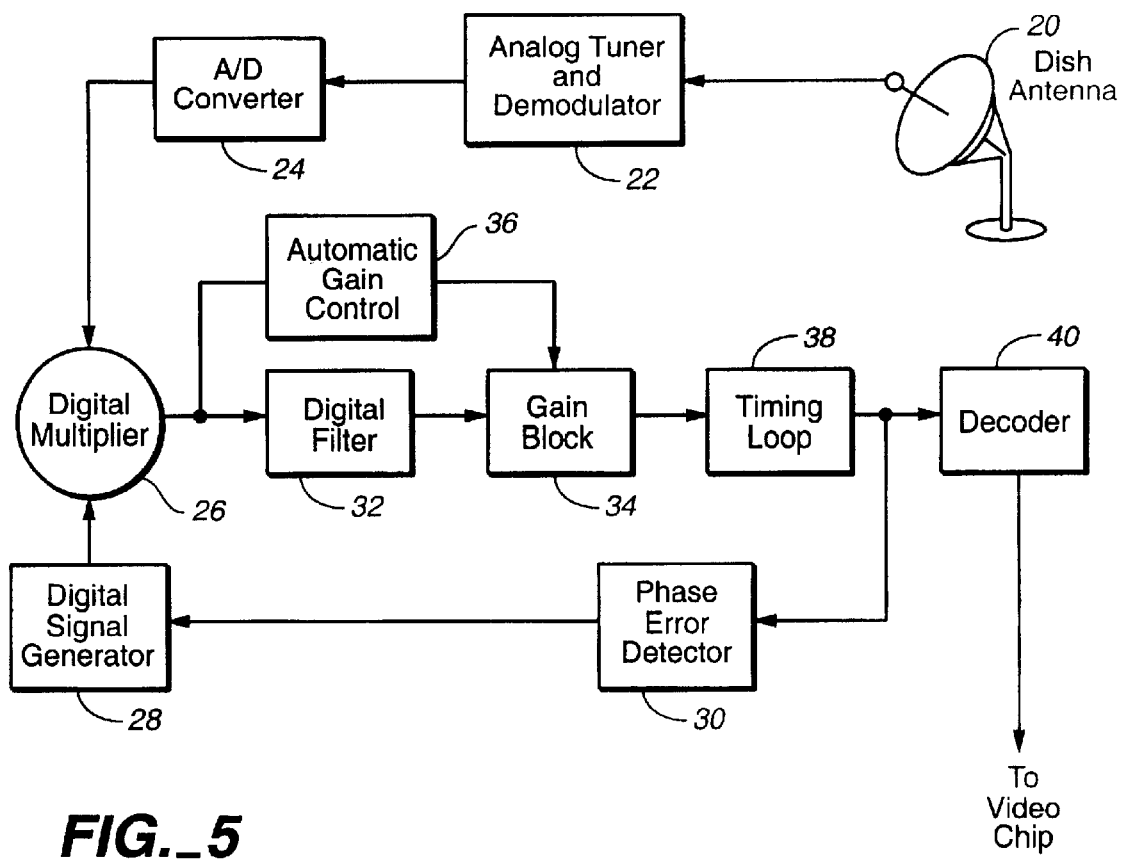
FIG._5

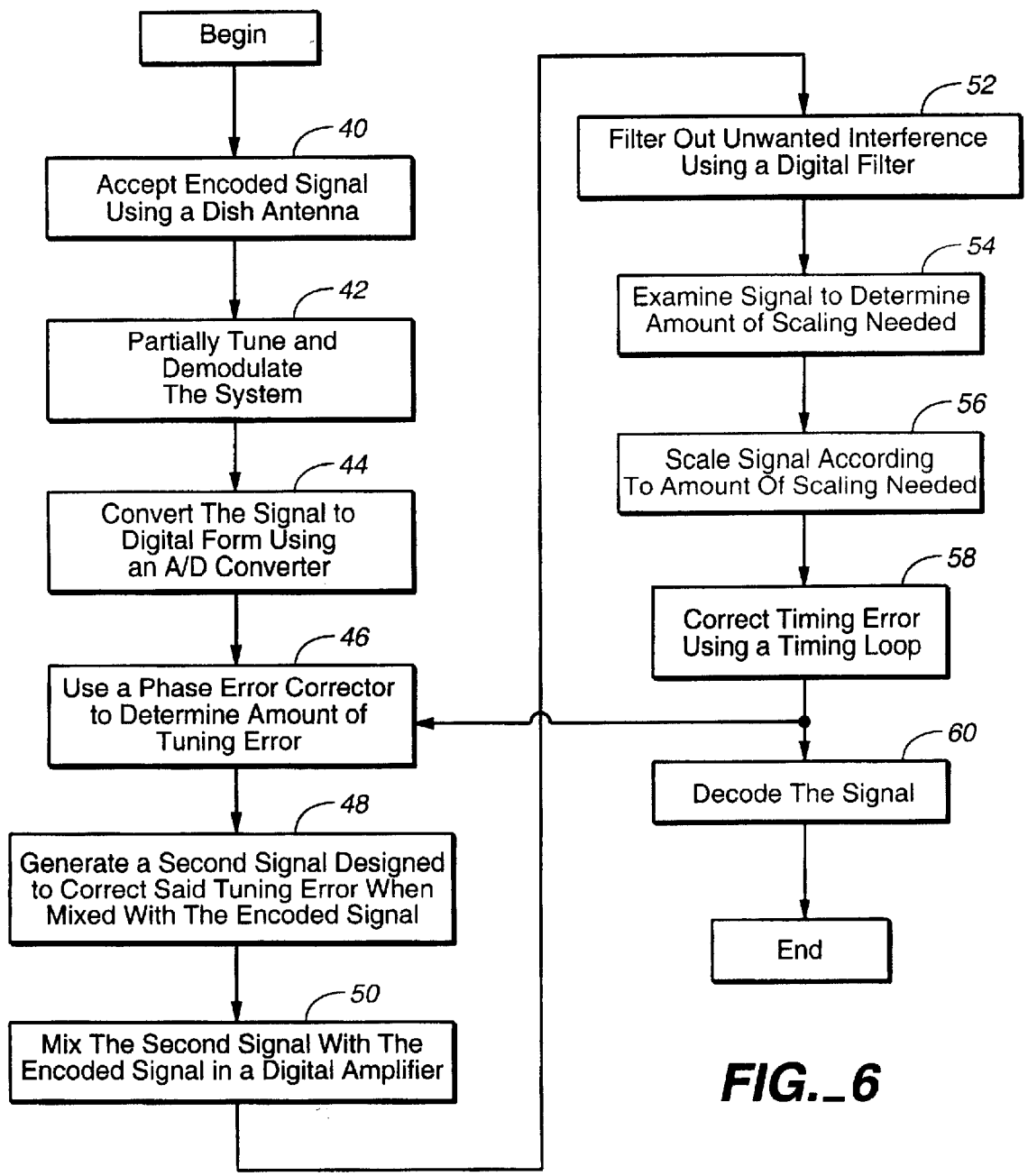
FIG._6

METHOD AND APPARATUS FOR DIGITAL INTERFERENCE REJECTION

CROSS-REFERENCE TO RELATED APPLICATION

This application is a continuation and claims priority based on parent application Ser. No. 09/008,109, now issued as U.S. Pat. No. 6,167,098 on Dec. 26, 2000, entitled "METHOD AND APPARATUS FOR DIGITAL INTERFERENCE REJECTION" by Christopher Keate, Ravi Bhasdaran and Dariush Dabiri, filed on Jan. 16, 1998 and commonly owned herewith.

BACKGROUND OF THE INVENTION

1. Field of the Invention

The present invention relates to the rejection of electronic interference. More specifically, the present invention relates to a method and apparatus for digital interference rejection.

2. The Prior Art

Interference rejection is performed in many types of electronic systems. However, it has specific application in the process of tuning channels for television or radio equipment because of the fact that a specific channel the user wishes to tune in is surrounded on either side by interference (either other channels or noise). In recent years, digital television signals have been becoming more and more prevalent as more consumers have discovered the benefits (better picture resolution, clearer sound quality) of digital television. Digital satellite television has been one of the types of communication to benefit from this transition.

The original signal received by a satellite dish (sometimes called a dish antenna) comprises a large number of channels. The tuning process takes this signal and alters it so that the channel the user wishes to view is exactly at the midpoint of the signal. This tuning process varies by the type of implementation. Oftentimes, tuning is performed in several different steps, with filters mixed in between the tuning steps to narrow the bandwidth of the signal and make it more manageable. The prior art tuners generally perform the entire tuning process on analog signals. Therefore, the conversion from analog to digital signal would take place after the tuner has been encountered.

One of the advantages of digital satellite systems is the ability to have a variable bandwidth system. This allows each channel to have a different sized bandwidth if the provider so wishes. The advantage of this is that the provider could specify a large bandwidth for a channel that will contain a great deal of information (perhaps a movie channel, where picture quality and sound quality are most important), while specifying a small bandwidth for a channel that will contain less information (perhaps a news channel, or an audio-only channel) in order to efficiently allocate overall bandwidth and allow the provider to transmit a larger number of channels than would be possible with fixed bandwidth allocation. The difference between a fixed bandwidth system and a variable bandwidth system can be seen in FIGS. 1–2.

FIG. 1 shows an example of the channel spectrum in a fixed channel bandwidth system. The spectrum in such a system is predefined such that each channel uses the same amount of bandwidth. In FIG. 1, moving up and down along the vertical axis of the spectrum represents higher or lower frequencies. It is apparent that channels 10, 11, 12, and 13 all take up the same amount of bandwidth. These types of systems are still in use today in most radio and television broadcasts. One of their advantages is that a single receiver (the television or radio) can be used to tune in a multitude of different systems.

Currently, most television and radio stations are "local" stations, having local broadcasting towers. It is almost always the case that different cities in the country have their own lineup of stations due to the localized nature of most television and radio broadcasts. For example, the television station on "channel 11" in Los Angeles is almost certainly different from the television station on "channel 11" in New York. Due to this phenomenon, it is useful to have systems that use fixed bandwidths for different stations. Therefore, a television set will be able to pick up channel 11 in Los Angeles as easily as picking up channel 11 in New York.

With the advent of satellite television, it is now possible to have a single lineup of stations, all broadcast from a satellite in geosynchronous orbit over the country. This allows the provider to have variable bandwidth channels, such that channel 11, for example, could have a smaller bandwidth than channel 10. Of course, it is still possible to have these variable bandwidth channel systems for use with local television systems, but given the limited signal quality of analog transmissions such a complex system would have little benefit.

FIG. 2 represents an example of a variable bandwidth system. In the example, channel 11 has a smaller bandwidth than channel 10. Channel 11, therefore, would probably have been designated such a small bandwidth because the programming found on that channel is that in which the highest quality sound and/or picture is not required.

A problem arises, however, in filtering variable bandwidth signals. The filter or filters used after the signal has passed through the tuner must be able to filter out different sized bandwidth signals. For example, if the desired channel had a bandwidth of 2 MHz, the signal would have to be passed through a filter designed to filter only 2 MHz "worth" of signal, while if the desired channel had a bandwidth of 10 MHz would have to be passed through a filter designed to filter out a 10 MHz signal. If the channel is passed through an incorrect filter, the resulting output will either have a portion of the channel cut off, or have portions of surrounding channels included. The most common solution to this problem is to use a plurality of filters. Therefore, for a system which has 50 different possible channel bandwidth sizes, it would contain 50 different filters.

Addition challenges lie in the tuning of specific channels. The tuners for these types of systems work by selecting a certain band from the signal received. However, analog tuner and filtering systems generally can only select wide bands as they are unable to make the precise filtering required to select a signal having a bandwidth as small as, for example, 2 MHz. The result of this is that after a signal is passed through an analog tuning and filtering system, the output is actually multiple channels worth of signal rather than one single channel. This phenomenon is depicted in FIGS. 3–4. Both FIGS. 3 and 4 show examples of how an analog tuner and filtering system actually selects a wide band of signal, resulting in excess channels (or fragments of channels) included in the output signal. In both of the figures, the user has attempted to tune to channel 11, but the output of the tuner is actually channels 11 and 12, and fragments of channels 10 and 13. While channel 11 is near the middle of the tuned portion in both of the figures, there will still be a need to filter out the remaining channels in order to result in only one channel being viewed on the television set.

Another problem with analog tuners and filters is that they have trouble tuning exactly to the frequency that the user wishes to tune. In a signal that was "perfectly tuned", the tuner would return a signal with a bandwidth whose midpoint was exactly in the middle of the channel desired to be tuned. An example of this "perfectly tuned" signal is depicted in FIG. 3. As one can see in FIG. 3, the output of the tuner is still a tuned portion containing multiple channels worth of signal, but the midpoint of this tuned portion is precisely in the middle of channel 11.

An "imperfectly tuned" signal is depicted in FIG. 4. As one can see in FIG. 4, the midpoint of the tuned portion is not exactly in the middle of channel 11. Unfortunately, due to the limitations of analog tuners, an "imperfectly tuned" channel is quite common, and a "perfectly tuned" signal is quite rare. Therefore, there is a need to correct for this tuning error so that the result is a "perfectly tuned" (or "finely tuned") signal.

The result of both tuning the signal and filtering the signal before converting the signal is converted to digital form is that the acquisition time for tuning a specific channel is long. Digital tuning and filtering can be performed much faster than analog. An example of this is the acquisition time in the common digital satellite systems on the market (which use completely analog tuning and filtering devices), where the system takes a second to a few seconds to display the channel on the screen after the user has selected a specific channel.

It is an object of the present invention to provide an apparatus which overcomes some of the limitations of the prior art.

BRIEF DESCRIPTION OF THE INVENTION

Digital interference rejection of a signal is accomplished by first converting the signal to digital. Then a second signal is generated and mixed with the first signal. This combined signal is then filtered. The signal can then be scaled as needed, resulting in a finely tuned, interference free signal.

BRIEF DESCRIPTION OF THE DRAWINGS

FIG. 1 is an example of the channel spectrum in a system using fixed bandwidth channels.

FIG. 2 is an example of the channel spectrum in a system using variable bandwidth channels.

FIG. 3 depicts an example of a signal "perfectly tuned" to channel 11 in the variable bandwidth system from FIG. 2.

FIG. 4 depicts an example of a signal "imperfectly tuned" to channel 11 in the variable bandwidth system from FIG. 2.

FIG. 5 depicts the system for interference rejection in accordance with a presently preferred embodiment of the invention.

FIG. 6 is a flow diagram depicting the method for interference rejection, in accordance with a presently preferred embodiment of the invention.

DETAILED DESCRIPTION OF THE INVENTION

Those of ordinary skill in the art will realize that the following description of the present invention is illustrative only and not in any way limiting. Other embodiments of the invention will readily suggest themselves to such skilled persons.

According to the present invention, various embodiments of a novel apparatus and method for interference rejection are disclosed which allow for a rapid acquisition while still providing for the necessary requirements in tuning a channel.

The invention disclosed herein may be used in any system that requires interference rejection. The presently preferred embodiments of the present invention described in detail herein, however, are designed specifically for use in digital satellite television applications. The scope of the invention should not in any way be limited to such systems.

FIG. 5 depicts a presently preferred embodiment of the invention. A dish antenna 20 receives a signal from a satellite. This signal contains a variety of channels, stored as digital information, which have been encoded and modulated for transmission. Encoding is a process by which data is altered into code words using a predefined scheme. The encoded data can then be transmitted without fear of an unauthorized user being able to view or otherwise use the data. An authorized user who then receives this data can use a predefined scheme to decode the information. The use of encoding and decoding also has the advantage of providing for increased error-correcting ability, where certain encoding schemes allow for a user to quickly detect and correct errors that may have occurred during the transmission process. Numerous encoding and decoding schemes are known to those skilled in the relevant art.

Modulation is a process by which a carrier wave is altered in accordance with the signal wave containing the data to be transmitted. Normally, the carrier wave has a frequency considerably higher than the signal wave, allowing for more effective transmission of large amounts of data.

The embodiments of the invention described in the present application are based on a system using QPSK modulation. QPSK modulation (which stands for Quadrature Phase-Shift Keying) involves representing the signal in two waveforms having the same frequency but with phases separated by 90 degrees. This is the presently preferred method of modulating satellite signals. It involves splitting the signal into two signals, called a Q-signal and an I-signal. In the QPSK modulation of a satellite signal, one of the waveforms is based on the sine function (the I signal) and one of the waveforms is based on the cosine function (the Q signal). Together, the I and Q signals represent all of the data in the original signal. Throughout this application, the singular terms "signal", "input", and "output" will be used. However, due to the complexity of these and other methods of representing video signals, one skilled in the art will recognize that, in a system using modulation such as QPSK, the term "signal" actually means "2 signals", "input" means "2 inputs", "output" means "2 outputs" and so on.

Of course, when a user receives the modulated signal it must then be demodulated before it can be viewed. The QPSK modulation scheme is known by those skilled in the art. In addition there are numerous modulation schemes that would be compatible with the present invention, all of which are known by those skilled in the art.

The signal received by the dish antenna 20 is passed through an analog tuner and demodulator. The tuner attempts to narrow and orient the signal, so that the channel the user is attempting to view is in at the midpoint of the signal. The demodulator takes the carrier wave and attempts to reduce it back to the state it was in before modulation. Tuning and modulation can be performed by separate devices. However, many systems combine the two into a single device which includes oscillators, multipliers, and filters, which performs both tasks at the same time. This combination of tuning and demodulation is sometimes known as "down-conversion". Normally, at least some of the tuning and demodulation must be performed by these analog means due to the large overall bandwidths of television systems. However, exactly how much of the filtering and demodulation that is performed using analog means is up to the manufacturer, who will balance speed and performance versus the cost of using digital tuning and filtering means.

After the signal has passed through the analog tuner and demodulator 22, it may then be passed through an analog to digital converter 24, which converts the signal to digital form. In one embodiment of the invention, the analog to digital converter is most likely a dual analog to digital converter, since it must convert both the I and the Q signals. Analog to digital converters are known in the prior art.

After the signal has been converted into digital form, it is passed to the digital multiplier 26. The digital multiplier acts in conjunction with the digital signal generator 28 to perform the part of the tuning job which was not performed by the analog tuner and demodulator. The digital signal generator 28 in the present embodiment of the invention includes a numerically controlled oscillator. By having the system perform part of the tuning job digitally, the acquisition time (which is a function of how fast the system performs tuning) is decreased considerably. The digital signal generator 28 produces a signal which, when combined with the signal from the A/D converter 24 in the digital multiplier 26, produce a signal which has been finely tuned. As discussed earlier, one of the major obstacles in tuning a signal is finely tuning the signal so that the channel lies exactly in the middle of the tuned portion. To that end, the phase error detector 30 examines the output signal after it has been passed through the digital filter bank 32, the gain block 34 and a timing loop 38. The signal at that point should represent a perfectly tuned signal. However, oftentimes this is not the case. Therefore, the phase error detector 30 picks up on the amount of tuning error (how "off" the tuning is) and issues commands to the digital signal generator 28 as to what digital signal to generate. The digital multiplier 26 then combines this generated signal with the signal it receives from the A/D converter, resulting in a "finely tuned" signal. The phase error detector 30 along with the digital signal generator 28 and digital multiplier 26 can be thought of as an error correcting feedback loop. Since all the processes in this feedback loop are performed digitally, the acquisition time in tuning a channel is greatly decreased.

As part of this tuning process, the signal can also be fully demodulated (if it wasn't fully demodulated in the analog tuner and demodulator). The signal generated by the digital signal generator 28 takes into account the amount of demodulation necessary and, when combined with the original signal, will produce a finely tuned and demodulated signal.

After the signal has been "finely tuned" by the digital multiplier 26, it is passed through one of the digital filters in the digital filter bank 32. The object of these filters is to remove all of the surrounding channels, leaving only the channel the user wishes to view remaining in the signal. As discussed earlier, one of the drawbacks of using a variable bandwidth system is that the filtering system must then be able to filter out different bandwidth channels. The most common way this is performed is through the use of a bank of filters, each filter able to filter out a specific bandwidth channel. However, if there is a design which would allow a single digital filter to perform the same function as the multiple bank of filters, then one of ordinary skill in the art would recognize that this system could be easily adapted to use such a filter.

After passing through the digital filter bank 32, the signal then represents a finely tuned, demodulated, single channel. However, when tuning digital signals, the energy at the output of the system may be different from that at the input of the system since different channels contain different levels of energy. Therefore, it is often necessary to add gain to the signal to correct for this energy discrepancy. Since each channel contains a different level of energy, the amount of gain added must often be increased or decreased depending on the channel. This is sometimes referred to as "scaling".

The present embodiment of the invention uses an automatic gain control 36, which determines the correct amount scaling by examining the signal after it has been converted to digital form and then gives instructions to the gain block 34 on whether to increase or decrease the amount of gain in order to correct for the energy discrepancy. The gain block 34 essentially increases the amplitude of the digital signal through scaling. The automatic gain control 36 is set up for use with this particular "tuning" and filtering system. There will normally be a fixed energy level at which all of the output signals from the system should be. Depending upon which channel is being "tuned", the automatic gain control 36 will know to adjust the gain a particular amount so that the output energy level matches this fixed level. This information on each of the channels can either be hardwired into the automatic gain control 36 during its design, or can be fed to the automatic gain control 36 during use. The automatic gain control could actually examine the signal at any point in the system, but it is most logical for it to examine the signal after it has passed through the digital multiplier 26 as, at that point, the signal has been finely tuned to a specific channel. The gain block 34 is essentially a multiplier which will then scale the signal accordingly.

The output of the gain block 34 is a signal which has been tuned, demodulated, and scaled. However, the signal has yet to be corrected for errors in timing. When a signal is first modulated by the provider, a certain timing is used when splitting the signal into phases. Despite the fact that the user's device will use a design that is manufactured to have the same timing as the provider's, there are often unavoidable differences in the timings of the two devices due to the imprecise nature of manufacturing. Therefore, a system for tuning and demodulating should also include a means to correct for this timing error. The timing loop 38 provides this function. Timing loops are used in a wide variety of applications and are known by those skilled in the art.

The output of the timing loop 38 is then a digitally tuned channel (possibly represented by I and Q signals) at a fixed energy level. However, this channel is still in an encoded form. As discussed earlier, many systems will encode data prior to transmission in order to prevent unauthorized access and to aid in error-correction. One encoding scheme which is commonly used is Reed-Solomon coding. Reed-Solomon coding is known in the art. A decoder 40 designed for use with Reed-Solomon coding is then placed in the system so that the transmitted code words can be translated back into the original data. An example of a Reed-Solomon decoder is disclosed and claimed in application Ser. No. 09/004,748, now issued as U.S. Pat. No. 6,081,920 issued on Jun. 27, 2000, entitled "METHOD AND APPARATUS FOR FAST DECODING OF A REED-SOLOMON CODE" by Robert Morelos-Zaragoza, commonly owned herewith.

After the signal has been passed through the decoder 40, it can then be sent to a video chip for the final process of displaying the channel on a television set.

Since many of the components of the system are digital, the speed of the system is much faster than that of a comparable analog one. In addition, due to the nature of digital design, the digital components of the system could be placed on a single small chip, taking up much less space in a receiver than an analog counterpart.

One of ordinary skill in the art will recognize that these components can be placed in a different order and still perform essentially the same functions. The invention, therefore, should not be limited to the order of components listed in above embodiment of the invention.

Another presently preferred embodiment of the present invention is a method for receiving an encoded signal. FIG. 6 is a flow diagram depicting this method. The encoded signal is received by a dish antenna (also known as a satellite dish) in step 40. This signal is then partially tuned and demodulated in step 42. How much of the signal is tuned and demodulated in this step is up to the manufacture, who must balance the speed and efficiency of doing it later, with the lower cost of doing it in this step. Then the signal is converted to digital form using an A/D converter in step 44. In step 46, a phase error detector can be used to determine the amount of tuning error in the signal. Since this step is essentially a feedback loop, the phase error detector may be examining the signal as it leaves step 58. A second signal designed to correct the tuning error when mixed with the encoded signal is then generated in step 48. This signal is mixed with the encoded signal in a digital multiplier in step 50 and then the unwanted interference is filtered using a digital filter in step 52.

In step 54, the signal is examined to determine the amount of scaling that is needed in order to have a fixed power output. Then in step 56, the appropriate scaling is performed using a gain block, which is essentially a multiplier. In step 58, any timing error is corrected using a timing loop. Lastly, in step 60, the signal is decoded. The result is a completely tuned, filtered, demodulated, decoded signal.

One of ordinary skill in the art will recognize that some of the steps in this method may be performed in a different order while still maintaining the overall effect of the method. There are certain steps which cannot be performed before certain other steps. For example, digital filtering cannot occur before the signal is converted from analog to digital form, nor can a digital multiplier be used before the signal is converted from analog to digital form. However, many of the remaining steps may be performed in a different order. In addition, many steps can be left out completely without disrupting the novelty of the invention, While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. An apparatus for interference rejection comprising:
    a digital signal input and a digital signal output;
    a digital signal generator having an output;
    a digital multiplier having a first input, a second input, and an output, said output of said digital signal generator coupled to said first input of said digital multiplier, said second input of said digital multiplier being said digital input of said apparatus;
    a digital filter bank having an input and an output, said output of said multiplier coupled to said input of said digital filter bank; and
    a gain block having an input and an output, said output of said digital filter bank coupled to said input of said gain block, said output of said gain block being said digital output of said apparatus.

2. An apparatus in accordance with claim 1 wherein said digital signal generator includes an input.

3. An apparatus in accordance with claim 2, further comprising:
    a phase error detector having an input and an output, said output of said gain block coupled to said input of said phase error detector, and said output of said phase error detector coupled to said input of said digital signal generator.

4. An apparatus in accordance with claim 1 wherein said digital signal generator is a digital numerically controlled oscillator.

5. An apparatus in accordance with claim 1 wherein said gain block further includes a second input.

6. An apparatus in accordance with claim 5, further comprising:
    an automatic gain control having an input and an output, said output of said automatic gain control coupled to said second input of said gain block, and said output of said digital multiplier coupled to the input of said automatic gain control.

7. A system for receiving encoded transmissions, comprising:
    an interference rejector having a digital signal input and a digital signal output, said interference rejector including:
        a digital signal generator having an output;
        a digital multiplier having a first input, a second input, and an output, said output of said digital signal generator coupled to said first input of said digital multiplier, said second input of said digital multiplier being said digital signal input of said interference rejector;
        a digital filter bank having an input and an output, said output of said multiplier coupled to said input of said digital filter bank;
        a gain block having an input and an output, said output of said digital filter bank coupled to said input of said gain block, and wherein said output of said gain block is said digital signal output of said interference rejector; and
        a timing loop having an input and an output, said output of said timing loop coupled to said input of said gain block; and
    a decoder having an input and an output, said output of said interference rejector coupled to said input of said decoder.

8. A system in accordance with claim 7 wherein said digital signal generator of said interference rejector includes an input.

9. A system in accordance with claim 8 wherein said interference rejector further includes:
    a phase error detector having an input and an output, said output of said gain block coupled to said input of said phase error detector, and said output of said phase error detector coupled to said input of said digital signal generator.

10. A system in accordance with claim 7 wherein said digital signal generator of said interference rejector is a digital numerically controlled oscillator.

11. A system in accordance with claim 7 wherein said gain block of said interference rejector further includes a second input.

12. A system in accordance with claim 11 wherein said interference rejector further includes:

an automatic gain control having an input and an output, wherein said output of said automatic gain control is coupled to said second input of said gain block, and said output of said digital multiplier is coupled to the input of said automatic gain control.

13. A method for interference rejection of a tuned and demodulated first digital signal, comprising:
   generating a second digital signal;
   mixing said second digital signal with said first digital signal to produce a mixed signal; and
   filtering out unwanted interference from said mixed signal using a digital filter having a variable gain to produce a filtered signal.

14. A method in accordance with claim 13, further comprising: scaling said filtered signal.

15. A method in accordance with claim 13 wherein said generating further includes:
   determining the amount of tuning error by examining the first digital signal; and
   producing said second digital signal designed to correct said tuning error when mixed with the first digital signal.

16. A method in accordance with claim 15 wherein said determining further includes using a phase error detector to determine the amount of tuning error by examining the first digital signal for phase error.

17. A method in accordance with claim 13 wherein said generating includes using a digital numerically controlled oscillator to generate said second digital signal.

18. A method in accordance with claim 13 wherein said mixing includes mixing said second digital signal with the first digital signal in a digital multiplier.

19. A method in accordance with claim 13 wherein said mixing includes:
   determining the amount of scaling needed by examining said first digital signal; and
   scaling said first digital signal according to the amount of scaling needed.

20. A method in accordance with claim 19 wherein said mixing includes using a gain block to scale said first digital signal.

21. A method in accordance with claim 20 wherein said using a gain block includes using a multiplier to scale the first digital signal.

22. A method in accordance with claim 19 wherein said determining includes using an automatic gain control to determine the amount of scaling needed by examining the first digital signal.

23. A method in accordance with claim 13 further including correcting for timing errors in the first digital signal.

24. A method in accordance with claim 23 wherein said correcting includes using a timing loop to correct for timing errors in the first digital signal.

25. A method for processing a first digital signal, comprising:
   performing interference rejection on said first digital signal, wherein said performing interference rejection includes:
      generating a second digital signal,
      mixing said second digital signal with said first digital signal to produce a mixed signal; and
      filtering out unwanted interference from said mixed signal using a digital filter to produce a filtered signal.

26. A method in accordance with claim 25, further comprising:
   scaling said filtered signal.

27. A method in accordance with claim 25 wherein said generating further includes:
   determining the amount of tuning error by examining the first digital signal; and
   producing said second digital signal designed to correct said tuning error when mixed with the first digital signal.

28. A method in accordance with claim 27 wherein said determining includes using a phase error detector to determine the amount of tuning error by examining the first digital signal for phase error.

29. A method in accordance with claim 27 wherein said generating includes using a digital numerically controlled oscillator to generate said second digital signal.

30. A method in accordance with claim 25 wherein said mixing includes mixing said second digital signal with said first digital signal in a digital multiplier.

31. A method in accordance with claim 25 wherein said mixing includes:
   determining the amount of scaling needed by examining the first digital signal; and
   scaling said first digital signal according to the amount of scaling needed.

32. A method in accordance with claim 31 wherein said mixing includes using a gain block to scale said first digital signal.

33. A method in accordance with claim 32 wherein said using a gain block includes using a multiplier to scale the first digital signal.

34. A method in accordance with claim 31 wherein said determining includes using an automatic gain control to determine the amount of scaling needed by examining the first digital signal.

35. A method in accordance with claim 25 further including correcting for timing errors in the first digital signal.

36. A method in accordance with claim 35 wherein said correcting includes using a timing loop to correct for timing errors in the first digital signal.

37. A method for processing an encoded digital signal, comprising:
   performing interference rejection on the encoded digital signal, wherein said performing includes:
      generating a second digital signal;
      mixing said second digital signal with said encoded digital signal to produce a mixed signal; and
      filtering out unwanted interference from said mixed signal using a digital filter to produce a filtered signal.

38. A method in accordance with claim 37 wherein said performing interference rejection further includes:
   scaling said filtered signal to produce a scaled signal; and
   decoding said scaled signal.

39. A method in accordance with claim 37 wherein said generating includes:
   determining the amount of tuning error by examining the encoded digital signal; and
   producing said second digital signal designed to correct said tuning error when mixed with the encoded digital signal.

40. A method in accordance with claim 39 wherein said determining includes using a phase error detector to determine the amount of tuning error by examining the encoded digital signal for phase error.

41. A method in accordance with claim 39 wherein said generating includes using a digital numerically controlled oscillator to generate said second digital signal.

42. A method in accordance with claim 37 wherein said mixing includes said second digital signal with the encoded digital signal in a digital multiplier.

43. A method in accordance with claim 37 wherein said mixing includes:
   determining the amount of scaling needed by examining said filtered signal; and
   scaling said filtered signal according to the amount of scaling needed.

44. A method in accordance with claim 43 wherein said mixing includes using a gain block to scale the encoded digital signal.

45. A method in accordance with claim 44 wherein said using a gain block includes using a multiplier to scale the encoded digital signal.

46. A method in accordance with claim 43 wherein said determining includes using an automatic gain control to determine the amount of scaling needed by examining the encoded digital signal.

47. A method in accordance with claim 37 further including correcting for timing errors in the encoded digital signal.

48. A method in accordance with claim 47 wherein said correcting includes using a timing loop to correct for timing errors in the encoded digital signal.

49. A method in accordance with claim 37 further including correcting for timing errors in the encoded digital signal.

50. A method in accordance with claim 49 wherein said correcting includes using a timing loop to correct for timing errors in the encoded digital signal.

* * * * *